Patented Sept. 30, 1924.

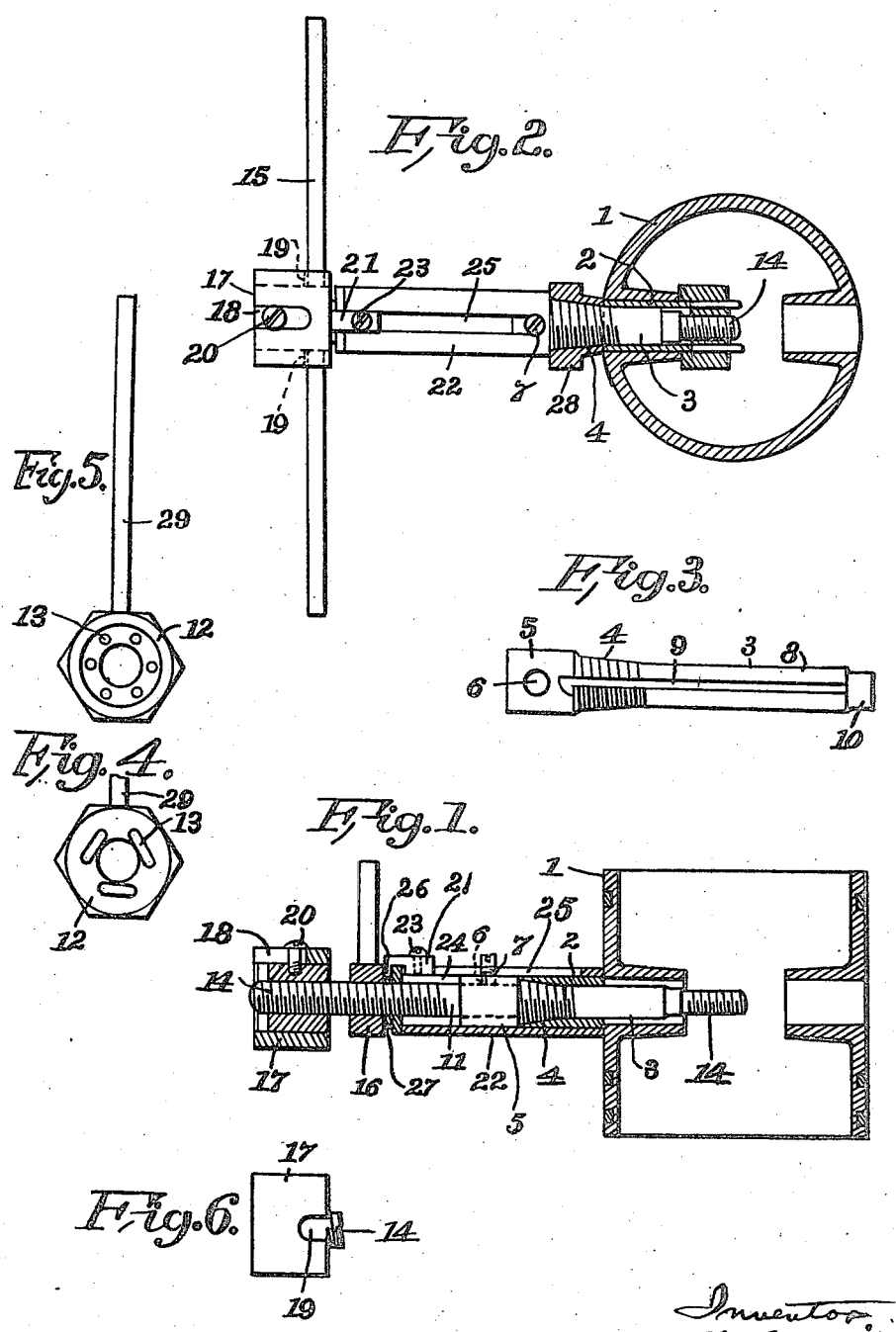

1,510,291

UNITED STATES PATENT OFFICE.

ALBERT D. ALEXANDER, OF FREDERICKSBURG, VIRGINIA.

BUSHING EXTRACTOR AND INSERTER.

Application filed May 29, 1922. Serial No. 564,426.

*To all whom it may concern:*

Be it known that I, ALBERT D. ALEXANDER, a citizen of the United States, residing at Fredericksburg, in the county of Spottsylvania and State of Virginia, have invented certain new and useful Improvements in Bushing Extractors and Inserters, of which the following is a specification.

My invention relates to bushing extractors or pullers, and to inserters for the same, and is designed more particularly for the Ford piston, or any piston that has a bushing to be removed or replaced.

The object of my invention is to remove the worn bushing and replace a new one without destroying the cylinder walls or cracking the same, as it will be seen that the sleeve presses against the wall of the piston and the bushing is drawn out in the sleeve, by the screw fitting in the nut on the shank of the stem.

In the drawings forming a part of this specification, and in which like symbols of reference represent corresponding parts in the several views:—

Figure 1 is a horizontal sectional plan view of the device showing it applied to a bushing;

Figure 2 is a view of the device showing it pressing the bushing into place;

Figure 3 shows the bushing extractor;

Figure 4 is a back view of locking nut;

Figure 5 is a front view of the same; and,

Figure 6 is a view of the slip-collar locking nut.

In the drawings 1 represents the piston; 3 the tube or bushing extractor; and 2 the bushing in the piston. The bushing extractor has a threaded portion 4, a head 5, formed with an internally threaded hole 6, and 7 a screw to be received in hole 6. 8 is the pilot of the extractor; 9 grooves or lands in the same; and 10 reduced head for locating pins in nut. The bushing extractor is hollow and is adapted to receive the screw-threaded rod 11.

12 is what I term a locating nut, formed with a series of pins 13 passing through the same, the object thereof being to hold the nut in register in replacing the bushing. As the bushing goes home it pushes these pins back through the nut. 14 is the main spindle of the device over the portion 11 of which the bushing extractor 3 is adapted to be screwed; and 15 is the handle made fast to nut 16. 17 is a slip-collar locking nut, formed with grooves 18 and 19, and within the collar 17 is a nut made fast to stem 14. 20 is a set-screw in slip-collar the object of the same being to hold collar to stem; and the grooves 19 are for receiving the handle and locking same when collar 17 is shifted.

21 is a holder adapted to be connected to sleeve 22 by means of a screw 23 taking into recess 24 at the end of slot 25. The holder 21 has an overhanging lip 26 taking into the circumferential groove 27 in nut 16. 29 is handle of locating nut.

The operation of the device will be apparent from the foregoing description of its parts and functions. In Figure 1 locking collar 17 is slipped over handle 15 and locks the handle to 14, by which means the threaded portion, shown in Figure 3, is screwed into bushing and cuts its own threads. By slipping back lock 17 the handle is freed, and by turning handle the screw 14 is pulled through sleeve 22, withdrawing bushing 2. By turning screw 14 backwards collar 22 is withdrawn from over bushing 2, so that it may be removed from part 3.

Figure 2 illustrates method of pressing bushing into piston. In this case I have a removable collar 28 which is placed over threads on the extractor 3 and bushing is placed in front of this collar. The locating nut is made up on the end of screw 14, pins 13 entering recesses. By this means the locating or guiding nut is held in register and the bushing forced to place pushing back pins 13.

Having now fully described my invention, what I claim as new, and desire to secure by Letters Patent, is:—

1. A bushing extractor and inserter, comprising a main spindle, a bushing-engaging tube to receive the same, a handle to operate the spindle and tube, and means for locking the handle to the spindle.

2. A bushing extractor and inserter, comprising a main spindle, a bushing-engaging tube adapted to receive and be operated by the same, a sleeve formed with a longitudinal slot, a screw in the tube operating in the slot, and means for operating the main spindle.

3. In a device of the character described, a bushing-engaging tube, a spindle in the same, a nut on the spindle, a handle connected to the nut, and a slip collar having connection with the main spindle and adapted to lock the same to the spindle.

4. In a device of the character described, a main threaded spindle, an engaging tube adapted to receive the same and be operated by it, said tube formed with a reduced end, a nut on the spindle, a handle connected to the nut, and a locating nut adapted to be received on the inner end of the spindle, said locating nut having pins working in perforations in same to extend around the spindle, the pins being forced back as the bushing is forced home.

5. In a bushing extractor and inserter, the combination with a main spindle, of an engaging tube adapted to receive the spindle and be operated by it, means to rotate the spindle, and a collar adapted to be received on the engaging portion of the tube and contact with and force the bushing home.

6. In a bushing extractor and inserter, the combination with a main spindle, a threaded tube adapted to be received on the spindle, a sleeve formed with a longitudinal slot, a screw in the tube and operating in the slot, a nut carrying a handle and formed with a circumferential groove, and a holder formed with an overhanging lip engaging said slot and connected to the sleeve at the end of the longitudinal slot.

7. In a device of the character described, the combination with a threaded spindle, of a tube formed with a conical end, said tube adapted to be received upon and operated in conjunction with the main spindle, a nut fast on the spindle, a slip-collar connected to said nut, and a handle carrying nut on the spindle, said handle adapted to be locked by the slip-collar.

In testimony whereof I affix my signature.

ALBERT D. ALEXANDER.